(12) United States Patent
Nakagawa et al.

(10) Patent No.: US 8,384,842 B2
(45) Date of Patent: Feb. 26, 2013

(54) DISPLAY DEVICE

(75) Inventors: Atsuo Nakagawa, Mobara (JP); Eiji Oohira, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 360 days.

(21) Appl. No.: 12/511,137

(22) Filed: Jul. 29, 2009

(65) Prior Publication Data

US 2010/0027234 A1 Feb. 4, 2010

(30) Foreign Application Priority Data

Jul. 31, 2008 (JP) ................................. 2008-197405

(51) Int. Cl.
*G02F 1/1333* (2006.01)

(52) U.S. Cl. ............. 349/60; 349/59; 349/122; 174/255

(58) Field of Classification Search .................... 362/632
See application file for complete search history.

(56) References Cited

U.S. PATENT DOCUMENTS

| 2005/0099555 | A1* | 5/2005 | Kim | 349/58 |
| 2007/0132909 | A1* | 6/2007 | Oohira | 349/58 |
| 2007/0279547 | A1 | 12/2007 | Tanaka | |
| 2009/0180051 | A1* | 7/2009 | Lee | 349/58 |

FOREIGN PATENT DOCUMENTS

JP 2007-323016 12/2007

* cited by examiner

*Primary Examiner* — Tuan T Dinh
*Assistant Examiner* — Steven Sawyer
(74) *Attorney, Agent, or Firm* — Antonelli, Terry, Stout & Kraus, LLP.

(57) ABSTRACT

A display device which narrows a width of a frame thereof is provided. A display device includes a first substrate on which a plurality of switching elements is formed, a second substrate which is arranged to face the first substrate in an opposed manner, and a frame which is mounted on an outer peripheral portion of the first substrate by way of an adhesive layer. The adhesive layer and the frame each have an opening at a position corresponding to the plurality of switching elements formed on the first substrate, and an inner peripheral surface of the opening of the frame and an inner peripheral surface of the opening of the adhesive layer are made coplanar with each other.

15 Claims, 6 Drawing Sheets

DISPLAY DEVICE

CROSS-REFERENCE TO RELATED APPLICATION

The disclosure of Japanese Patent Application No. 2008-197405 filed on Jul. 31, 2008 including the specification, drawings and abstract is incorporated herein by reference in its entirety.

BACKGROUND OF THE INVENTION

1. Field of the Invention

The present invention relates to a display device, and more particularly to a display device which can narrow a picture frame thereof.

2. Description of the Related Art

In a display device such as a liquid crystal display device, there has been known a technique which adheres a frame to a peripheral portion of a liquid crystal panel for reinforcing the liquid crystal panel or facilitating mounting of the liquid crystal panel on equipment.

For example, JP-A-2007-323016 (patent document 1) discloses a liquid crystal display device in which a substrate on which a display element is formed and a frame are adhered to each other using a pressure-sensitive adhesive double coated tape having light blocking property.

SUMMARY OF THE INVENTION

Recently, there has been a strong demand for narrowing of a picture frame of a display device, that is, narrowing of a non-display region in a peripheral portion of the display device. To satisfy such a demand, it is necessary to narrow a width of the above-mentioned frame. In the related art, the frame is formed by injection molding using a synthetic resin as a material and hence, narrowing of the width of the frame is limited. Further, even if a frame having a sufficiently narrow width is formed, it will be difficult to accurately adhere a pressure-sensitive adhesive double coated tape to such a frame having the narrow width.

The invention has been made under such circumstances, and it is an object of the invention to provide a display device which can narrow a width of a frame of the display device.

To briefly explain the summary of typical inventions among the inventions disclosed in this specification, they are as follows.

(1) According to one aspect of the invention, there is provided a display device which includes: a first substrate on which a plurality of switching elements is formed; a second substrate which is arranged to face the first substrate in an opposed manner; and a frame which is mounted on an outer peripheral portion of the first substrate by way of an adhesive layer, wherein the adhesive layer and the frame each have an opening, and an inner peripheral surface of the opening of the frame and an inner peripheral surface of the opening of the adhesive layer are made coplanar with each other.

(2) In the display device having the constitution (1), the openings are formed at a position corresponding to the plurality of switching elements formed on the first substrate.

(3) In the display device having the constitution (2), the plurality of switching elements is formed on a display region of the display device.

(4) In the display device having the constitution (1), the frame has a uniform thickness.

(5) In the display device having the constitution (1), the frame and the adhesive layer are formed by a method which includes the steps of: forming an adhesive material layer on a resin sheet; and forming the opening in the resin sheet and the adhesive material layer by working in a state that the resin sheet and the adhesive material layer are stacked on each other.

(6) In the display device having the constitution (1), the frame and the adhesive layer has a cutaway portion which connects the opening with an outer periphery of the frame and an outer periphery of the adhesive layer.

(7) In the display device having the constitution (6), the first substrate further has an external connection region, and the cutaway portion is arranged on a side of the frame and the adhesive layer opposite to a side at a position corresponding to the external connection region.

(8) In the display device having the constitution (7), the cutaway portion is arranged at an approximately middle portion of the side opposite to a side at a position corresponding to the external connection region.

(9) In the display device having the constitution (1), at least one projection is formed on an outer periphery of the frame.

(10) In the display device having the constitution (1), at least one notch is formed in the outer periphery of the frame.

(11) In the display device having the constitution (1), the adhesive layer is a pressure-sensitive adhesive double coated tape.

(12) In the display device having the constitution (1), the adhesive layer is a layer formed by applying an adhesive agent by coating.

According to the invention described above, it is possible to provide the display device which can narrow a width of a frame.

DETAILED DESCRIPTION OF THE INVENTION

Hereinafter, a first preferred embodiment of the invention is explained in conjunction with FIG. 1 to FIG. 4.

Figure 1:
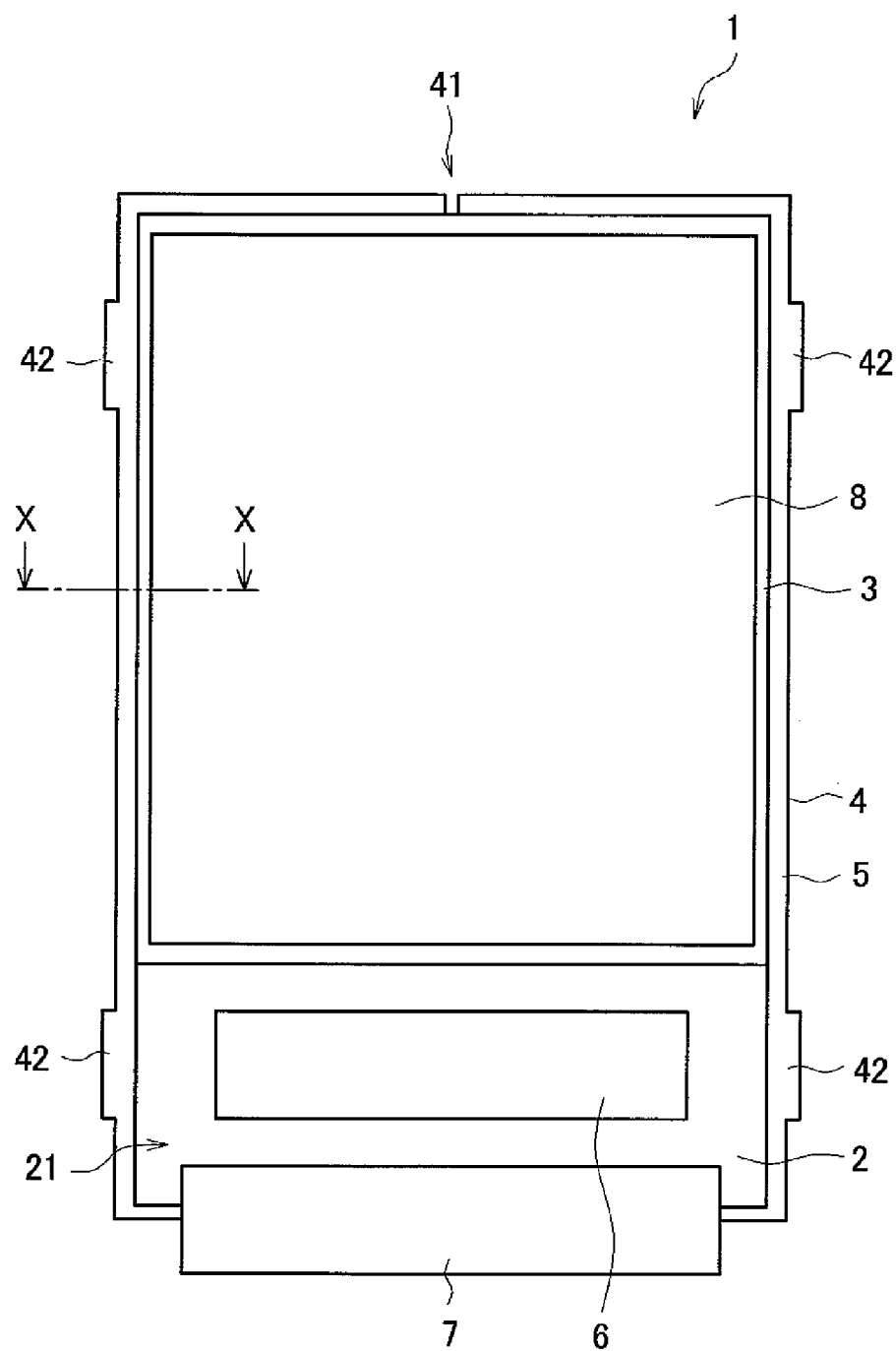
FIG. 1 is a plan view of a display device according to a first embodiment.

FIG. 1 is a plan view of a display device according to the first embodiment 1. In this embodiment, the display device is a liquid crystal display device 1, and the liquid crystal display device 1 includes a TFT substrate 2 which constitutes a first substrate on which a plurality of TFTs (Thin Film Transistor) constituting switching elements is formed on a display region thereof, a color filter substrate 3 which constitutes a second substrate on which color filters are formed, and liquid crystal which is sandwiched between the TFT substrate 2 and the color filter substrate 3. By forming a signal voltage in the liquid crystal for every pixel, an image is formed. Here, as a driving method of the liquid crystal display device 1, any one of known methods, for example, any one of an IPS (In Plane Switching) method, a VA (Vertical Alignment) method, a TN (Twisted Nematic) method and the like may be used. A frame 4 is mounted on an outer peripheral portion of the TFT substrate 2 by way of an adhesive layer 5. On an external connection region 21 of the TFT substrate 2 where the TFT substrate 2 does not overlap with the color filter substrate 3, external connection terminals are provided. That is, an IC 6 for driving the liquid crystal and a flexible printed circuit board 7 for electrically connecting the display device with an external apparatus are connected to the external connection region 21. An upper polarizer 8 is arranged on the color filter substrate 3.

Figure 2:
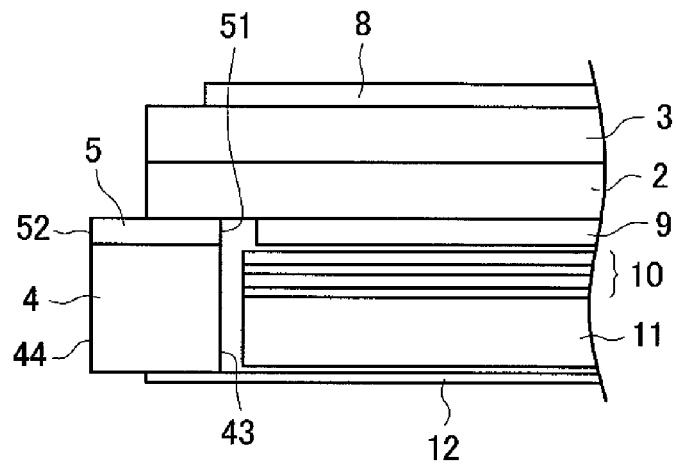
FIG. 2 is a cross-sectional view taken along a line X-X in FIG. 1.

FIG. 2 is a cross-sectional view taken along a line X-X in FIG. 1. As shown in the drawing, a lower polarizer 9 is mounted on the TFT substrate 2, and a group of optical sheets 10 and a backlight 11 are mounted on the lower polarizer 9. The group of optical sheets 10 is formed by suitably stacking known optical films such as a diffusion sheet and a prism sheet. The frame 4 and the adhesive layer 5 each have an opening at a position corresponding to the switching elements formed on the TFT substrate 2. The lower polarizer 9, the group of optical sheets 10 and the backlight 11 are housed in the inside of the opening. A reflection sheet 12 is arranged on a lower side of the frame 4.

Here, the frame 4 has a uniform thickness over the whole circumference thereof. This is because, as described later, the frame 4 is formed by blanking one piece of sheet material using a punch press. Accordingly, the term "uniform" implies that when the sheet material having a constant thickness is used, the thickness is constant within a range of the tolerance of thickness which the sheet material per se usually has. Here, a resin is preferably used as a material of the frame 4. Among resins, a polycarbonate is preferably used. However, the material of the frame 4 is not limited to a resin, and various kinds of fiber reinforced resins, metals, ceramics or the like can be suitably used as a material of the frame 4.

Further, an inner peripheral surface 43 of the opening of the frame 4 and an inner peripheral surface 51 of the opening of the adhesive layer 5 are made coplanar with each other. This is because, as described later, a piece of sheet material and an adhesive material layer are blanked using a punch press in a state that the sheet material and the adhesive material layer are stacked on each other. That is, the term "coplanar" implies that the inner peripheral surface 43 and the inner peripheral surface 51 are on the same plane within a range of the tolerance which is usually generated in working. An outer peripheral surface 44 of the frame 4 and an outer peripheral surface 52 of the adhesive layer 5 are made coplanar for substantially the same reason.

Figure 3:
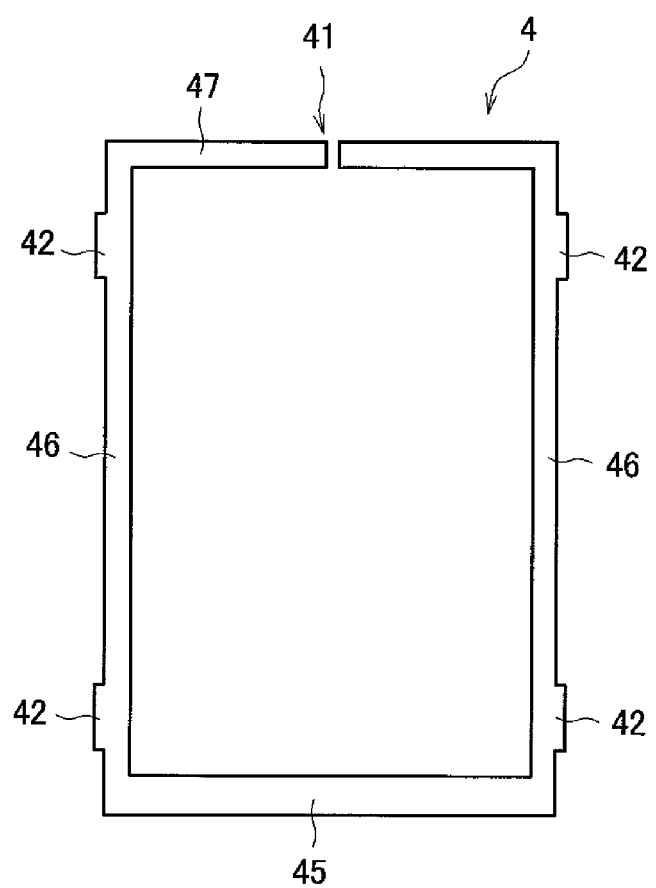
FIG. 3 is a plan view of a frame according to the first embodiment.

FIG. 3 is a plan view of the frame 4 of the liquid crystal display device according to the first embodiment. The frame 4 includes a front side 45 which constitutes a side of the frame 4 at a position corresponding to the external connection region 21 (see FIG. 1), lateral sides 46 which are contiguously formed with both ends of the front side 45, and a depth side 47 which constitutes a side of the frame 4 at a position opposite to the front side 45. Here, a cutaway portion 41 is formed in the depth side 47, and projections 42 are formed on the lateral sides 46 respectively. In the drawing, widths of the respective sides are set such that a width of the front side 45 is slightly larger than widths of other sides, and the width of the lateral sides 46 and the width of the depth side 47 are slightly smaller than the width of the front side 45, and the lateral sides 46 and the depth side 47 have the same width. However, the widths of the respective sides are not limited to the above-mentioned widths, and widths of the respective sides can be suitably set.

The cutaway portion 41 is provided for allowing the opening of the frame 4 and the outer peripheries of the frame 4 and the adhesive layer 5 to communicate with each other. Due to such a constitution, it is possible to prevent the generation of cracks or twisting in the frame 4 and the occurrence of wrinkles or peeling-off in the adhesive layer 5 due to the deformation of the sheet material and the adhesive material layer generated at the time of blanking these parts using a punch press in a state where the sheet material and the adhesive material layer are stacked on each other. To increase the rigidity of the frame 4 as much as possible, it is preferable to form the cutaway portion 41 at a position on the depth side 47. It is more preferable to form the cutaway portion 41 at an approximately middle portion of the depth side 47. Further, a shape of the cutaway portion 41 is not particularly limited. That is, in addition to the shape shown in the drawing, the cutaway portion 41 may be formed by cutting the side obliquely or the cutaway portion 41 maybe rounded. Further, provided that there arises no drawback in working, the cutaway portion 41 may not be formed.

The projections 42 formed on the outer periphery of the frame 4 are provided for positioning the liquid crystal display device 1 and for fixing the liquid crystal display device 1 by snap fitting or other suitable method at the time of mounting the liquid crystal display device 1 on equipment. Accordingly, the position and the number of projections 42 are not limited to the example shown in the drawing, and a shape of the projection 42 is not limited to a quadrangular shape shown in the drawing and may be changed to a triangular shape, a semi circular shape or the like when necessary. When the projections 42 are considered unnecessary, the projections 42 may not be provided.

Next, a manufacturing method of the liquid crystal display device 1 is explained in conjunction with FIG. 4.

Figure 4A:
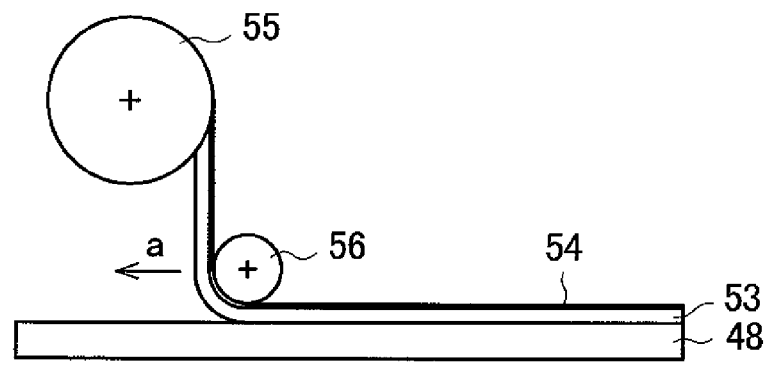
FIG. 4 is a view for explaining a manufacturing method of the display device according to the first embodiment.

First of all, as shown in FIG. 4A, an adhesive material layer 53 is stacked on a sheet material 48. Here, the adhesive material layer 53 is formed of a pressure-sensitive adhesive double coated tape, and a peel-off sheet 54 is adhered to an upper surface of the adhesive material layer 53. The adhesive material layer 53 and the peel-off sheet 54 are paid off from a reel 55, and are adhered to the sheet material 48 in the direction a in the drawing while being pressed to the sheet material 48 by a pressure bonding role 56.

Although the sheet material 48 may preferably be made of a resin such as polycarbonate, as described previously, the sheet material 48 may be made of other materials. Further, although the sheet material 48 is exemplified as a sheet body here, the sheet material may be paid off from the role.

Figure 4B:
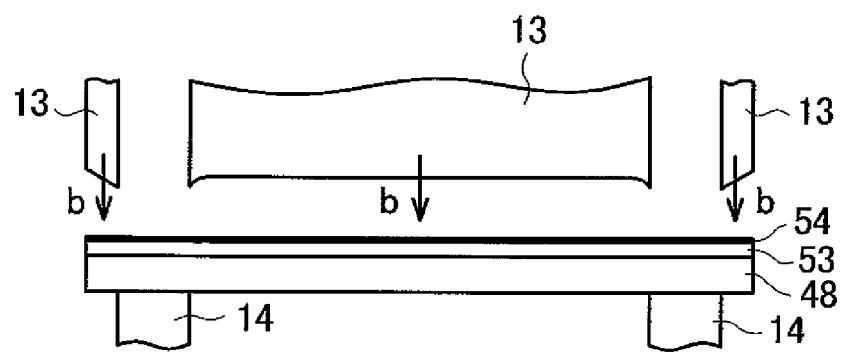

Next, as shown in FIG. 4B, in a state where the sheet material 48, the adhesive material layer 53 and the peel-off sheet 54 are stacked on each other, blanking is performed using a punch 13. Blanking is working in which the sheet material 48 is placed on a die 14 having a shape corresponding to a shape of the frame 4, and the sheet material 48 is cut by moving the punch 13 having a shape corresponding to the shape of the frame 4 in the direction b in the drawing. Due to such blanking, it is possible to acquire the adhesive layer 5 having the same shape as the frame 4.

Although blanking is explained as one preferable example here, provided that a working method can perform working in a state where the sheet material 48 and the adhesive material layer 53 are stacked, it is possible to adopt a suitable working method such as cutting using a sharp blade or laser working. Further, it is not necessary that the adhesive material layer 53 is stacked over the whole surface of the sheet material 48, and it is sufficient that the adhesive material layer 53 is stacked on at least a portion of the sheet material 48 which becomes the frame 4.

Figure 4C:
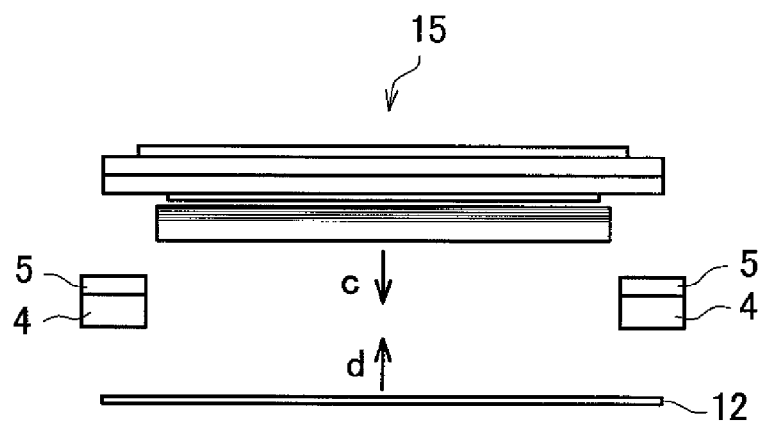

As a final step, as shown in FIG. 4C, the peel-off sheet 54 is peeled off, the liquid crystal display panel 15 is adhered in the direction c in the drawing, and the reflection sheet is adhered in the direction d in the drawing thus acquiring the liquid crystal display device 1. Here, the liquid crystal display panel 15 is an integral body formed of the TFT substrate 2, the color filter substrate 3, the upper polarizer 8, the lower polarizer 9, the group of optical sheets 10, and the backlight 11.

In the above-mentioned manufacturing method, the pressure-sensitive adhesive double coated tape is used for forming the adhesive material layer 53. However, the adhesive material layer 53 may be acquired by applying an adhesive agent in a liquid form to the sheet material 48 by coating. Here, as a coating method, a known method such as role coating, curtain coating, spray coating, ink jet or the like may be suitably used. In such a case, it is preferable to apply non adhesion working to a surface of the punch 13 including a side surface.

According to such a manufacturing method, the frame 4 is formed by mechanical working such as blanking, and it is unnecessary to adhere the pressure-sensitive adhesive double coated tape to the formed frame 4 again and hence, it is possible to acquire the liquid crystal display device 1 which has the frame 4 having a narrow width and the adhesive layer 5 having a narrow width.

Figure 5:
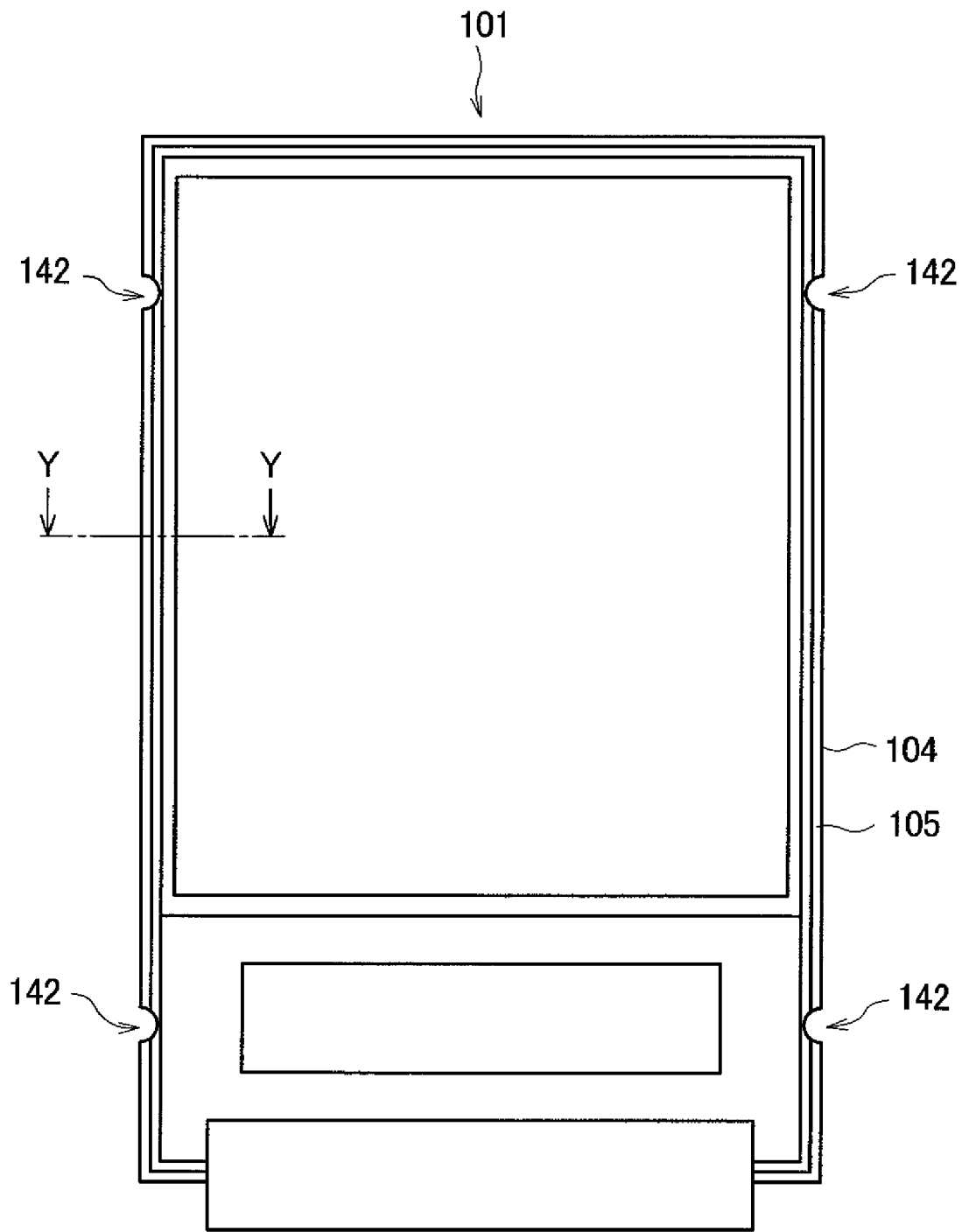
FIG. 5 is a plan view of a display device according to a second embodiment.
Figure 6:
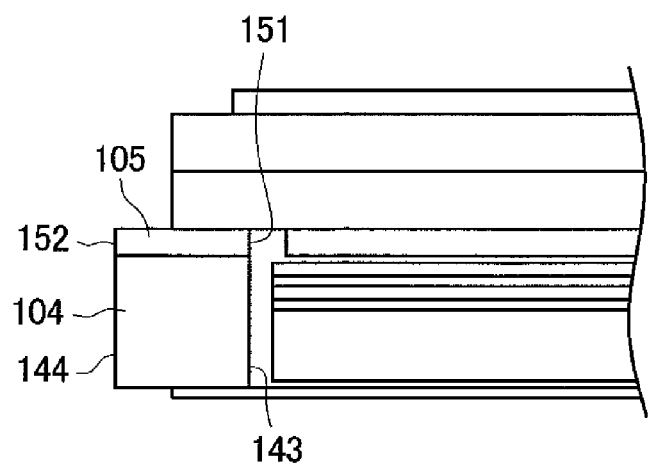
FIG. 6 is a cross-sectional view taken along a line Y-Y in FIG. 5.

Then, a second preferred embodiment of the invention is explained in conjunction with FIG. 5 and FIG. 6.

FIG. 5 is a plan view of a liquid crystal display device 101 which constitutes a display device according to the second embodiment. This embodiment is substantially equal to the first embodiment except that a shape of a frame 104 and a shape of an adhesive layer 105 slightly differ from the corresponding shapes of the frame 4 and the adhesive layer 5 in the first embodiment. Accordingly, the explanation of parts identical with the parts of the first embodiment is omitted.

In this embodiment, a profile of the adhesive layer 105 is set smaller than a profile of the frame 104. That is, as shown in FIG. 6 which is a cross-sectional view taken along a line Y-Y in FIG. 5, an outer peripheral surface 144 of the frame 104 and an outer peripheral surface 152 of the adhesive layer 105 are not made coplanar, and a stepped portion is formed. This is because that at the time of manufacturing the liquid crystal display device 101, a pressure-sensitive adhesive double coated tape having a profile smaller than the profile of the frame 104 is adhered to the sheet material as an adhesive material layer. On the other hand, an inner peripheral surface 143 of an opening formed in the frame 104 and an inner peripheral surface 151 of an opening formed in the adhesive layer 105 are made coplanar with each other. This is because, in the same manner as the first embodiment, blanking is performed in a state where the sheet material is stacked on the adhesive material layer. It is also possible to acquire the liquid crystal display device 101 having the frame 104 of a narrow width and an adhesive layer 105 of a narrow width.

It is not necessary that the profile of the adhesive layer is smaller than the profile of the frame 104 over the whole circumference of the frame 104. That is, it is sufficient that the profile of the adhesive layer 105 and the profile of the frame 104 agree with each other on some sides.

Further, as shown in FIG. 5, in this embodiment, in place of projections, notches 142 are formed for positioning and fixing of the liquid crystal display device 101 at the time of mounting the liquid crystal display device 101 on equipment. A shape of the notch 142 is not limited to a semi circular shape shown in the drawing, and may be a proper shape such as a quadrangular shape or a triangular shape. Further, in this embodiment, a cutaway portion is not formed.

Figure 7:
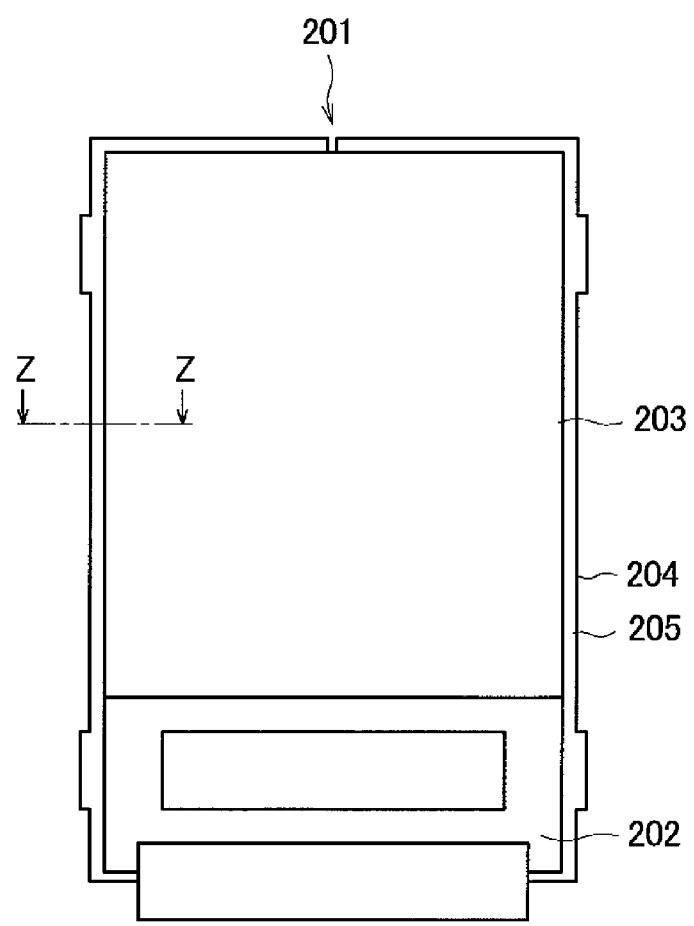
FIG. 7 is a plan view of a display device according to a third embodiment.
Figure 8:
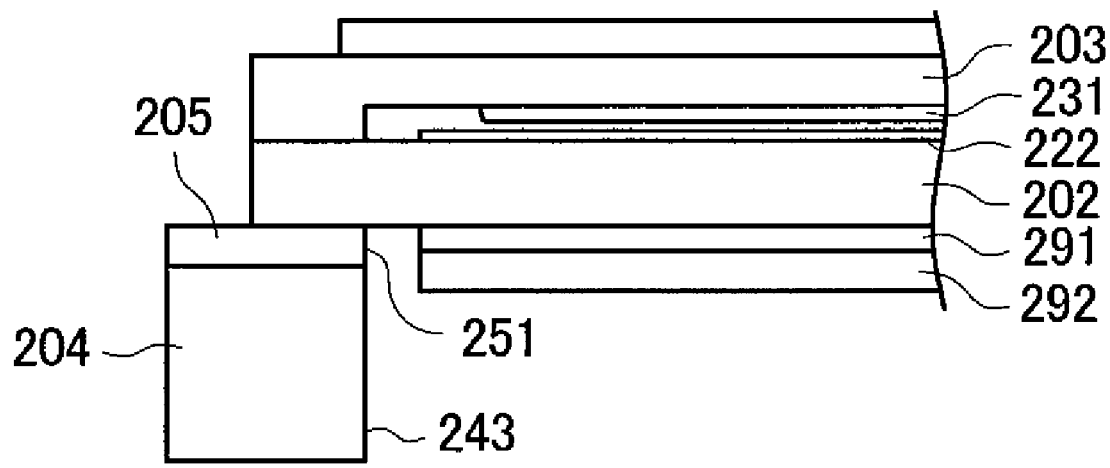
FIG. 8 is a cross-sectional view taken along a line Z-Z in FIG. 7.

Then, a third preferred embodiment of the invention is explained in conjunction with FIG. 7 and FIG. 8.

FIG. 7 is a plan view of a display device according to the third embodiment. In this embodiment, the display device is an organic EL display device 201. The organic EL display device 201 includes an EL substrate 202 which constitutes a first substrate, a sealing substrate 203 which constitutes a second substrate, a frame 204 and an adhesive layer 205. Also in this embodiment, the explanation of parts identical with the parts of the first embodiment is omitted.

FIG. 8 is a cross-sectional view taken along a line Z-Z in FIG. 7. An organic EL layer 222 is formed on the EL substrate 202. A desiccant layer 231 is formed on the sealing substrate 203. Further, on a surface of the EL substrate 202 on a side opposite to the organic EL layer 222, a phase difference plate 291 and a polarizer 292 are mounted. In this embodiment, the organic EL display device 201 is of a bottom emission type so that a display image is viewed from a front side in the drawing.

Also in this embodiment, the frame 204 and the adhesive layer 205 are formed by blanking in a state where the sheet material and the adhesive material layer are stacked on each other and hence, an inner peripheral surface 243 of an opening formed in the frame 204 and an inner peripheral surface 251 of an opening formed in the adhesive layer 205 are made coplanar with each other. Accordingly, it is possible to acquire the organic EL display device 201 having the frame 204 of a narrow width and the adhesive layer 205 of a narrow width.

Although the bottom-emission type organic EL display device is adopted in this embodiment, a top-emission type organic EL display device may be adopted.

What is claimed is:

1. A display device comprising:
   a first substrate on which a plurality of switching elements is formed;
   a second substrate which is arranged to face the first substrate in an opposed manner; and
   a frame which is mounted on an outer peripheral portion of the first substrate by way of an adhesive layer, wherein
   the adhesive layer and the frame each have an opening,
   an inner peripheral surface of the frame at an edge of the opening of the frame and an inner peripheral surface of the adhesive layer at an edge of the opening of the adhesive layer are made coplanar with each other, and
   an outer peripheral surface of the frame and an outer peripheral surface of the adhesive layer are made coplanar within each other,
   the frame has a continuous substantially planar surface extending between the inner peripheral surface and the outer peripheral surface of the frame on which the adhesive layer having the opening is mounted,
   the adhesive layer having the opening having a continuous substantially planar surface extending between the inner peripheral surface and the outer peripheral surface of the adhesive layer so as to be coplanar with the inner peripheral surface and the outer peripheral surface of the frame,
   the adhesive layer being a continuous member with the opening therethrough, and
   the continuous surface of the frame extending outwardly beyond the outer peripheral portion of the first substrate.

2. A display device according to claim 1, wherein the openings of the frame and the adhesive layer are formed at a position corresponding to the plurality of switching elements formed on the first substrate.

3. A display device according to claim 1, wherein the frame has a uniform thickness.

4. A display device according to claim 1, wherein the frame and the adhesive layer are formed by a method comprising the steps of:
- forming an adhesive material layer on a resin sheet; and
- forming the opening in the resin sheet and the adhesive material layer by working in a state where the resin sheet and the adhesive material layer are stacked on each other.

5. A display device according to claim 1, wherein the frame and the adhesive layer has a cutaway portion at the outer periphery of the frame and the outer periphery of the adhesive layer.

6. A display device according to claim 1, wherein at least one projection is formed on the outer periphery of the frame.

7. A display device according to claim 1, wherein at least one notch is formed in the outer periphery of the frame.

8. A display device according to claim 1, wherein the adhesive layer is a pressure-sensitive adhesive double coated tape.

9. A display device according to claim 1, wherein the adhesive layer is a layer formed by applying an adhesive agent by coating.

10. A display device according to claim 1, wherein the frame is formed as a one piece member.

11. A display device according to claim 1, wherein the opening within the continuous member of the adhesive layer is a punched out blanked opening of the continuous member of the adhesive layer.

12. A display device according to claim 2, wherein the plurality of switching elements is formed on a display region of the display device.

13. A display device according to claim 5, wherein the first substrate further has an external connection region, and the cutaway portion is arranged on a side of the frame and the adhesive layer opposite to a side at a position corresponding to the external connection region.

14. A display device according to claim 11, wherein the frame is a one piece member having the opening therein which is a punched out blanked opening so that at least the inner peripheral surfaces of the adhesive layer and the frame at respective edges of the openings thereof are coplanar.

15. A display device according to claim 13, wherein the cutaway portion is arranged at an approximately middle portion of the side opposite to a side at a position corresponding to the external connection region.

\* \* \* \* \*